United States Patent
Buentello et al.

(10) Patent No.: US 6,641,754 B2
(45) Date of Patent: Nov. 4, 2003

(54) METHOD FOR CONTROLLING SCALE FORMATION AND DEPOSITION IN AQUEOUS SYSTEMS

(75) Inventors: Kristin E. Buentello, Newtown, PA (US); Stephen M. Kessler, Plymouth Township, PA (US); Roger C. May, Warminster, PA (US); Julie A. Kaechelin, Feasterville, PA (US); Fu Chen, West Chester, PA (US); Natalie A. Kolson, West Chester, PA (US)

(73) Assignee: BetzDearborn Inc., Trevose, PA (US)

( * ) Notice: Subject to any disclaimer, the term of this patent is extended or adjusted under 35 U.S.C. 154(b) by 0 days.

(21) Appl. No.: 09/878,646

(22) Filed: Jun. 11, 2001

(65) Prior Publication Data

US 2003/0052303 A1 Mar. 20, 2003

Related U.S. Application Data

(63) Continuation-in-part of application No. 09/808,679, filed on Mar. 15, 2001, now Pat. No. 6,444,747.

(51) Int. Cl.$^7$ .............................. C08F 5/10; C08F 5/14
(52) U.S. Cl. .................... 252/180; 252/181; 252/175; 524/807; 526/287
(58) Field of Search ............................ 252/180, 181, 252/175; 524/807; 526/287

(56) References Cited

U.S. PATENT DOCUMENTS

| | | |
|---|---|---|
| 3,875,202 A | 4/1975 | Steckler |
| 4,471,100 A | 9/1984 | Tsubakimoto et al. |
| 4,659,480 A | 4/1987 | Chen et al. |
| 4,659,481 A | 4/1987 | Chen |
| 4,717,499 A | 1/1988 | Chen |
| 4,732,698 A | 3/1988 | Chen |
| 4,759,851 A | 7/1988 | Chen |
| 4,872,995 A | 10/1989 | Chen et al. |
| 4,895,663 A | 1/1990 | Chen |
| 4,913,822 A | 4/1990 | Chen et al. |
| 5,180,498 A | 1/1993 | Chen et al. |
| 5,292,379 A | 3/1994 | Reichgott et al. |
| 5,362,324 A | 11/1994 | Cerulli et al. |
| 5,391,238 A | 2/1995 | Reichgott et al. |
| 5,575,920 A | 11/1996 | Freese et al. |
| 5,661,206 A | 8/1997 | Tanaka et al. |
| 5,705,665 A | 1/1998 | Ichinohe et al. |

FOREIGN PATENT DOCUMENTS

| | | |
|---|---|---|
| EP | 448717 | 11/1995 |
| JP | 212152 | 8/2000 |
| JP | 226757 | 8/2000 |

OTHER PUBLICATIONS

Betz Handbook of Industrial Water Conditioning, 9th Edition, 1991, pp. 96–104.

Primary Examiner—Tae H. Yoon
(74) Attorney, Agent, or Firm—Steven D. Boyd

(57) ABSTRACT

A method of inhibiting the formation and deposition of scale forming moieties in aqueous systems by adding water-soluble or water-dispersible polymers is disclosed. The method comprises adding to an aqueous system a polymer having repeat units characterized by the Formula I:

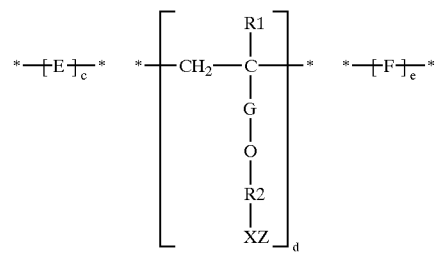

Wherein E is the repeat unit remaining after polymerization of an ethylenically unsaturated compound; preferably, a carboxylic acid, sulfonic acid, phosphonic acid, or amide form thereof or mixtures thereof. $R_1$ is H or lower $(C_1–C_4)$alkyl. G is —$CH_2$— or —$CHCH_3$—; $R_2$ is –$(CH_2$—$CH_2$—O$)_n$– or –$(CH_2$—$CHCH_3$—O$)_n$– where n ranges from about 1 to 100, preferably about 1 to 20. X is an anionic radical selected from the group consisting of $SO_3$, $PO_3$, or COO; Z is H or hydrogens or any water soluble cationic moiety which counterbalances the valence of the anionic radical X, including but not limited to Na, K, Ca, or $NH_4$. F, when present, is a repeat unit having the structure of Formula II:

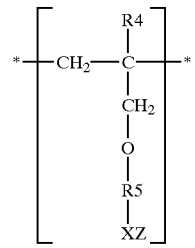

wherein X and Z are the same as in Formula I. $R_4$ is H or lower $(C_1–C_4)$alkyl. $R_5$ is hydroxy substituted alkyl or alkylene having from about 1 to 6 of carbon atoms.

40 Claims, No Drawings

METHOD FOR CONTROLLING SCALE FORMATION AND DEPOSITION IN AQUEOUS SYSTEMS

This application is a continuation-in-part of application Ser. No. 09/808,679 filed on Mar. 15, 2001 now U.S. Pat. No. 6,444,747.

FIELD OF THE INVENTION

The present invention relates to methods of inhibiting corrosion and controlling the formation and deposition of scale imparting compounds in aqueous systems such as cooling, boiler and gas scrubbing systems. The novel polymeric compositions which are useful in accordance with the present invention comprise water-soluble or water-dispersible copolymers of ethylenically unsaturated monomers with sulfate, phosphate, phosphite or carboxylic terminated polyalkylene oxide allyl ethers.

BACKGROUND OF THE INVENTION

The problems of corrosion and scale formation and the attendant effects have troubled water systems for years. For instance, scale tends to accumulate on internal walls of various water systems, such as boiler and cooling systems, and thereby materially lessen the operational efficiency of the system.

Deposits in lines, heat exchange equipment, etc., may originate from several causes. For example, precipitation of calcium carbonate, calcium sulfate and calcium phosphate in the water system leads to an accumulation of these scale-imparting compounds along or around the metals' surfaces which water circulating through the system. In this manner, heat transfer functions of the particular system are severely impeded.

Corrosion, on the other hand, is a degradative electrochemical reaction of a metal with its environment. Simply stated, it is the reversion of refined metals to their natural state. For example, iron ore is iron oxide. Iron ore is refined into steel. When steel corrodes, it forms iron oxide which, if unattended, may result in failure or destruction of the metal, causing the particular water system to shut down until the necessary repairs can be made.

Typically, in cooling water systems, the formation of calcium sulfate, calcium phosphate and calcium carbonate, among others, has proven deleterious to the overall efficiency of the cooling water system. Recently, due to the popularity of cooling treatments using high levels of orthophosphate to promote passivation of the metal surfaces in contact with the system water, it has become critically important to control calcium phosphate crystallization so that relatively high levels of orthophosphate may be maintained in the system to achieve the desired passivation without resulting in fouling or impeded heat transfer functions which would normally be caused by calcium phosphate deposition.

Silica ($SiO_2$) is present in most natural waters. When these waters are cycled in a cooling tower, the silica level increases and often a level is reached where precipitation of a silica species occurs. Sometimes the precipitation proceeds by the polymerization of silica itself, resulting in a silica gel. For this to occur, a relatively high $SiO_2$ concentration is required, usually greater than approximately 200 ppm. However, when certain cations are present, silica species can precipitate at much lower concentrations. Cations that promote silica precipitation include, but are not limited to, $Al^{3+}$, $Mg^{2+}$, $Zn^{2+}$ and $Fe^{3+}$. Aluminum is very insoluble in water and readily precipitates under cooling water conditions. When aluminum gets into a cooling system (such as by carryover) it can cause serious precipitation problems. One such problem is the precipitation of phosphate species which may be present as a corrosion inhibitor. Such precipitates can be problematic due to both deposition and corrosion effects.

Although steam generating systems are somewhat different from cooling systems, they share a common problem in regard to deposit formation.

As detailed in the Betz Handbook of Industrial Water Conditioning, $9^{th}$ Edition, 1991, Betz Laboratories Inc., Trevose, Pa., Pages 96–104, the formation of scale and sludge deposits on boiler heating surfaces is a serious problem encountered in steam generation. Although current industrial steam producing systems make use of sophisticated external treatments of the boiler feedwater, e.g., coagulation, filtration, softening of water prior to its feed into the boiler system, these operations are only moderately effective. In all cases, external treatment does not in itself provide adequate treatment since muds, sludge and hardness-imparting ions escape the treatment, and eventually are introduced into the steam generating system.

In addition to the problems caused by mud, sludge or silt, the industry has also had to contend with boiler scale. Although external treatment is utilized specifically in an attempt to remove calcium and magnesium from the feedwater, scale formation due to residual hardness, i.e., calcium and magnesium salts, is always experienced. Accordingly, internal treatment, i.e., treatment of the water fed to the system, is necessary to prevent, reduce and/or retard formation of scale imparting compounds and their resultant deposition. In addition to carbonates of magnesium and calcium being a problem as regards scale, having high concentrations of phosphate, sulfate and silicate ions either occurring naturally or added for other purposes cause problems since calcium and magnesium, and any iron or copper present, react and deposit as boiler scale. As is obvious, the deposition of scale on the structural parts of a steam generating system causes poorer circulation and lower heat transfer capacity, resulting in an overall loss in efficiency.

RELATED ART

U.S. Pat. No. 4,471,100 to Tsubakimoto et al. discloses a copolymer consisting of maleic acid and polyalkyleneglycol monoallyl ether repeat units useful as a dispersant for cement and paint and as a scale inhibitor for calcium carbonate.

U.S. Pat. Nos. 5,180,498; 5,292,379; and 5,391,238 to Chen et al., disclose copolymers of acrylic acid and polyethyleneglycol allyl ether for boiler water treatment and metal pretreating applications.

U.S. Pat. No. 5,362,324 describes terpolymers of (meth)acrylic acid and polyethyleneglycol-monomethylether-(meth)acrylate and polypropyleneglycol di(meth)acrylate for superplasticizer applications. U.S. Pat. No. 5,661,206 and EP448717 disclose similar technology but using diepoxy based compounds as crosslinking agents. Japanese Patents 93660, 226757 and 212152 disclose acrylic acid terpolymers with sodium methallylsulfonate and methoxy polyethylene glycol-monomethacrylate for superplasticizer applications.

U.S. Pat. No. 5,575,920 to Freese et al. discloses terpolymers of acrylic acid, allyloxy-2-hydroxypropylsulfonic ester (AHPS) and polyethyleneglycol allyl ether for cooling water treatment as calcium phosphate inhibitors.

U.S. Pat. No. 3,875,202 to Steckler discloses polymerizable ammonium and alkali metal salts of sulfated monoethylenically unsaturated alcohols of from 3 to 12 carbon atoms and of the alkenoxylated adducts of such alcohols. The polymerizable monomers are useful as co-polymerizable surfactants for self-stabilizing latexes and as comonomers in the copolymerization with other monomers in the preparation of co- or ter-polymeric films and fibers, especially as receptors for basic dyes and to build in anti-static properties. Monomers such as vinyl chloride, ethyl acrylate, 2-ethylhexyl acrylate, vinyl acetate and N-methyl acrylamide are disclosed in the patent to be copolymerizable with the ammonium salt of sulfated monoethylenically unsaturated alcohols. The copolymers disclosed are not water-soluble.

U.S. Pat. No. 5,705,665 to Ichinohe et al. relates to organic silicon compounds having as one of the components ethoxylated allyl alcohol with alkali metal salt of sulfonate group in the molecule. The resulting compound is useful as a surface treating agent and modifier for inorganic material. The copolymers disclosed are not water-soluble or dispersible.

DETAILED DESCRIPTION OF THE INVENTION

In accordance with the present invention, it has been surprisingly discovered that water-soluble or water-dispersible polymers, which contain pendant functional groups are effective in controlling the formation and deposition of mineral deposits and in inhibiting corrosion in various aqueous systems. The novel polymers useful in the present invention are copolymers or terpolymers having the structure of Formula I.

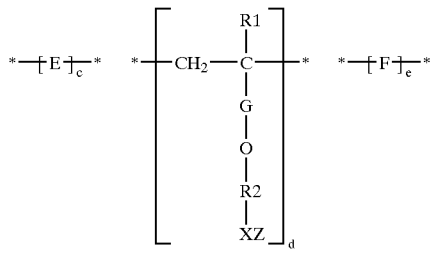

Formula I

Wherein E is the repeat unit remaining after polymerization of an ethylenically unsaturated compound; preferably, a carboxylic acid, sulfonic acid, phosphonic acid, or amide form thereof or mixtures thereof. $R_1$ is H or lower ($C_1$–$C_4$) alkyl. G is —$CH_2$— or —$CHCH_3$—; $R_2$ is —($CH_2$—$CH_2$—O$)_n$ or —($CH_2$—$CHCH_3$—O$)_n$ where n ranges from about 1 to 100, preferably about 1 to 20. X is an anionic radical selected from the group consisting of $SO_3$, $PO_3$, or COO; Z is H or hydrogens or any water soluble cationic moiety which counterbalances the valence of the anionic radical X, including but not limited to Na, K, Ca, or $NH_4$. F, when present, is a repeat unit having the structure of Formula II.

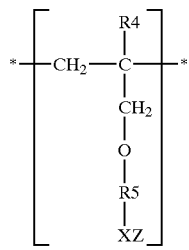

Formula II

In Formula II, X and Z are the same as in Formula I. $R_4$ is H or lower ($C_1$–$C_4$)alkyl. $R_5$ is hydroxy substituted alkyl or alkylene having from about 1 to 6 carbon atoms.

With respect to E of Formula I, it may comprise the repeat unit obtained after polymerization of a carboxylic acid, sulfonic acid, phosphonic acid, or amide form thereof or mixtures thereof. Exemplary compounds include but are not limited to the repeat unit remaining after polymerization of acrylic acid, methacrylic acid, acrylamide, methacrylamide, N-methyl acrylamide, N, N-dimethyl acrylamide, N-isopropylacrylamide, maleic acid or anhydride, fumaric acid, itaconic acid, styrene sulfonic acid, vinyl sulfonic acid, isopropenyl phosphonic acid, vinyl phosphonic acid, vinylidene di-phosphonic acid, 2-acrylamido-2-methylpropane sulfonic acid and the like and mixtures thereof. Water-soluble salt forms of these acids are also within the purview of the present invention. More than one type of monomer unit E may be present in the polymer of the present invention.

Subscripts c, d, and e in Formula I are the molar ratio of the monomer repeating unit. The ratio is not critical to the present invention providing that the resulting copolymer is water-soluble or water-dispersible. Subscripts c and d are positive integers while subscript e is a non-negative integer. That is, c and d are integers of 1 or more while e can be 0, 1, 2 . . . etc.

A preferred copolymer of the present invention, that is where e=0, is acrylic acid/polyethyleneglycol monoallyl ether sulfate of the structure:

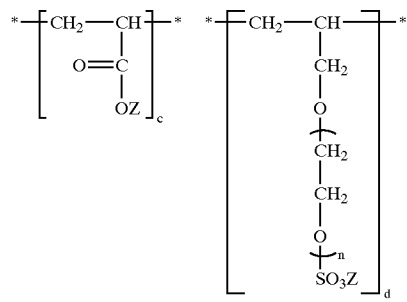

Formula III

Wherein n ranges from about 1 to 100, preferably about 1 to 20. Z is hydrogen or a water-soluble cation such as Na, K, Ca or $NH_4$.

Molar ratio c:d ranges from 30:1 to 1:20. Preferably, the molar ratio of c:d ranges from about 15:1 to 1:10. The ratio of c to d is not critical to the present invention providing that the resulting polymer is water-soluble or water-dispersible.

A preferred terpolymer of the present invention, that is where e is a positive integer, is acrylic acid/ polyethyleneglycol monoallyl ether sulfate/1-allyloxy-2-hydroxypropylsulfonic acid of the structure.

Formula IV

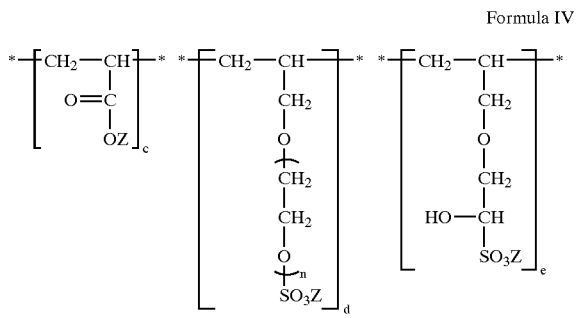

Wherein n ranges from about 1–100, preferably about 1–20. Z is hydrogen or a water-soluble cation such as, Na, K, Ca or $NH_4$. Z may be the same or different in c, d and e. The mole ratio of c:d:e is not critical so long as the terpolymer is water-soluble or water-dispersible. Preferably the mole ratio c:d:e ranges from about 20:10:1 to 1:1:20.

The polymerization of the copolymer and/or terpolymer of the present invention may proceed in accordance with solution, emulsion, micelle or dispersion polymerization techniques. Conventional polymerization initiators such as persulfates, peroxides, and azo type initiators may be used. Polymerization may also be initiated by radiation or ultra-violet mechanisms. Chain transfer agents such as alcohols, preferably isopropanol or allyl alcohol, amines or mercapto compounds may be used to regulate the molecular weight of the polymer. Branching agents such as methylene bisacrylamide, or polyethylene glycol diacrylate and other multifunctional crosslinking agents may be added. The resulting polymer may be isolated by precipitation or other well-known techniques. If polymerization is in an aqueous solution, the polymer may simply be used in the aqueous solution form.

The molecular weight of the water-soluble copolymer of Formula I is not critical but preferably falls within the range Mw of about 1,000 to 1,000,000. More preferably from about 1,000 to 50,000 and most preferably from about 1,500 to 25,000. The essential criteria is that the polymer be water-soluble or water-dispersible.

Use of the Polymers

The polymers of the invention are effective for water treatment in cooling water, boiler and steam generating systems as deposit control and/or corrosion inhibition agents. The appropriate treatment concentration will vary depending upon the particular system for which treatment is desired and will be influenced by factors such as the area subjected to corrosion, pH, temperature, water quantity and the respective concentrations in the water of the potential scale and deposit forming species. For the most part, the polymers of the present invention will be effective when used at levels of from about 0.1–500 parts per million parts of water, and preferably from 1 about to 100 parts per million of water contained in the aqueous system to be treated. The polymers may be added directly into the desired water system in an aqueous solution, continuously or intermittently.

The polymers of the present invention are not limited to use in any specific category of aqueous system. They would be expected to inhibit the formation and deposition of scale forming salts in any aqueous system prone to that problem. For instance, in addition to boiler and cooling water systems, the polymers may also be effectively utilized in scrubber systems and the like wherein corrosion and/or the formation and deposition of scale forming salts is a problem. Other possible environments in which the polymers of the present invention may be used include heat distribution type seawater desalting apparatus, dust collection systems in iron and steel manufacturing industries, mining operations and geothermal systems.

The water-soluble or dispersible polymers of the present invention may be used in combination with topping agents in order to enhance the corrosion inhibition and scale controlling properties thereof. For instance, the polymers of the present invention may be used in combination with one or more compounds selected from the group consisting of inorganic phosphoric acids or salts thereof, phosphonic acid salts, organic phosphoric acid esters, and polyvalent metal salts or mixtures thereof. Such topping agents may be added to the system being treated in an amount of from about 1 to 500 ppm.

Examples of inorganic phosphoric acids include condensed phosphoric acids and water-soluble salts thereof. Examples of phosphoric acids include orthophosphoric acids, primary phosphoric acids and secondary phosphoric acids and salts thereof. Examples of inorganic condensed phosphoric acids include polyphosphoric acids such as pyrophosphoric acid, tripolyphosphoric acid and the like, metaphosphoric acids such as trimetaphosphoric acid and tetrametaphosphoric acid and salts thereof.

Examples of other phosphoric acid derivatives, which can be combined with the polymers of the present invention include aminopolyphosphonic acids such as aminotrimethylene phosphonic acid, ethylene diaminotetramethylene phosphonic acid and the like, methylene diphosphonic acid, hydroxyethylidene diphosphonic acid, 2-phosphonobutane 1,2,4, tricarboxylic acid, etc. and salts thereof.

Exemplary organic phosphoric acid esters which may be combined with the polymers of the present invention include phosphoric acid esters of alkyl alcohols such as methyl phosphoric acid ester, ethyl phosphoric acid ester, etc., phosphoric acid esters of methyl cellosolve and ethyl cellosolve, and phosphoric acid esters of polyoxyalkylated polyhydroxy compounds obtained by adding ethylene oxide to polyhydroxy compounds such as glycerol, mannitol, sorbitol, etc. Other suitable organic phosphoric esters are the phosphoric acid esters of amino alcohols such as mono, di, and tri-ethanol amines. The water-soluble polymers may also be used in conjunction with molybdates such as, sodium molybdate, potassium molybdate, lithium molybdate, ammonium molybdate, etc.

The polymers of the present invention may be used in combination with yet other topping agents including corrosion inhibitors for iron, steel, copper, and copper alloys or other metals, conventional scale and contamination inhibitors, metal ion sequestering agents, and other conventional water treating agents. Examples of other corrosion inhibitors include tungstate, nitrites, borates, silicates, oxycarboxylic acids, amino acids, catechols, aliphatic amino surface active agents, benzotriazole, halogenated triazoles and mercaptobenzothiazole. Other scale and contamination inhibitors include lignin derivatives, tannic acids, starches, polyacrylic acids and their copolymers including but not limited to acrylic acid/2-acrylamido-2-methylpropanesulfonic acid copolymers and acrylic acid/allyloxy-2-hydroxypropane-3-sulfonic acid copolymers, maleic acids and their copolymers, polyepoxysuccinic acids and polyacrylamides, etc. Examples of metal ion sequestering agents include polyamines, such as ethylene diamine, diethylene triamine and the like and polyamino carboxylic acids, such as nitrilo triacetic acid, ethylene diamine tetraacetic acid, and diethylenetriamine pentaacetic acid.

U.S. Pat. Nos. 4,659,481; 4,717,499; 4,759,851; 4,913,822; and 4,872,995 disclose the use of specific copolymers in treating cooling, boiler, steam generating and other aqueous heat transfer systems to inhibit deposition of scales such as calcium phosphate, calcium phosphonate, calcium oxalate, iron oxide, zinc oxide and silica. Based upon the deposit control efficacy exhibited by the polymers of the present invention, it is believed that they could be substituted for the polymers disclosed in the above and other similar patents to provide improved performance in a wide variety of water based treatment applications.

The copolymers of the present invention can be used alone or in combination with conventional cleaning agents such as surfactants, chelating agents, citric acid, phosphoric acid and other common reagents to remove deposit and prevent fouling on membranes used in the micro filtration, ultra filtration and reverse osmosis applications.

The present invention will now be further described with reference to a number of specific examples which are to be regarded solely as illustrative and not as restricting the scope of the present invention.

EXAMPLES

Example 1
Preparation of Acrylic Acid/Ammonium Allylpolyethoxy (10)Sulfate Copolymer A suitable reaction flask was equipped with a mechanical agitator, a thermometer, a reflux condenser, a nitrogen inlet and two addition inlets for the initiator and monomer solutions. The flask was charged with 73.5 g of deionized water and 58.5 g (0.1 mol) of ammonium allyl polyethoxy (10)sulfate. While sparging with nitrogen, the solution was heated to 85° C. An initiator solution containing 2.2 g of 2,2'-azobis(2-amidinopropane)hydrochloride (Wako V-50, from Wako Chemical Company) was sparged with nitrogen for ten minutes. The initiator solution and 21.6 g. (0.3 mol) of acrylic acid were added gradually to the reaction flask over a two-hour period. Following the addition, the solution was heated to 95° C. and held for 90 minutes. The reaction was then cooled to lower than 40° C. and 50% caustic solution was added until the pH measured 8–9. The structure of the resulting copolymer was verified by Carbon 13 NMR. The polymer solution was diluted to 30% solids and had a Brookfield viscosity of 48.6 cps at 25° C.

Example 2
Preparation of Acrylic Acid/Ammonium Allylpolyethoxy (10)Sulfate Copolymer Utilizing the procedure and apparatus similar to the prior example, 147 g of deionized water and 61.9 g (0.11 mol) of ammonium allyl polyethoxy(10)sulfate (DVP-010, from Bimax Inc.) were charged to the reaction flask. The solution was heated to 85° C. An initiator solution containing sodium persulfate 1.9 g in water was sparged with nitrogen for ten minutes. The initiator solution and 22.9 g (0.32 mol) of acrylic acid were gradually added to the reaction flask over a two-hour period. Following the addition, the solution was heated to 95° C. and held for 90 minutes. The reaction was cooled to lower than 40° C. and 50% caustic solution was added until the pH measured 4–5. The structure of the resulting copolymer was verified by Carbon 13 NMR. The polymer solution was diluted to 30% solids and had a Brookfield viscosity of 13.0 cps at 25° C.

Example 3
Preparation of Acrylic Acid/Ammonium Allylpolyethoxy (10)Sulfate/Allyloxy-2-hydroxypropane-3-sulfonic Acid Terpolymer Utilizing the procedure and apparatus similar to Example 1, 84.7 g of deionized water, 21.8 g (0.1 mol) of allyloxy-2-hydroxypropane-3-sulfonic acid and 58.5 g (0.1 mol) of the ammonium allyl polyethoxy-(10)-sulfate monomer were charged to the reaction flask. While sparging with nitrogen, the solution was heated to 85° C. An initiator solution of 2,2'-azobis(2-amidinopropane)hydrochloride and 21.6 g (0.3 mol) of acrylic acid were added to the reaction flask over a 3.5 hour period. Following the addition, the solution was heated to 95° C. and held for two hours. The reaction was cooled and a 50% caustic solution was added for pH adjustment. The structure of the resulting copolymer was verified by Carbon 13 NMR. The polymer solution was diluted to 30% solids and had a Brookfield viscosity of 27.2 cps at 25° C.

Example 4
Preparation of Acrylic Acid/Methacrylic Acid/Ammonium Allylpolyethoxy (10)Sulfate Terpolymer Utilizing the procedure and apparatus similar to Example 1, 109.7 g of deionized water, 20.6 g of isopropyl alcohol and 58.5 g (0.1 mol) of ammonium allyl polyethoxy-(10)-sulfate monomer mixture were charged to the reaction flask. While sparging with nitrogen, the solution was heated to 85° C. A solution of sodium persulfate and 21.6 g (0.3 mol) of acrylic acid and 8.6 g (0.1 mol) of methacrylic acid were added separately to the reaction flask over a two-hour period. Following the addition, the solution was heated to 95° C. and held for two hours. After the reaction, isopropyl alcohol was removed from the solution before cooling down and pH adjustment. The structure of the resulting copolymer was verified by Carbon 13 NMR. The polymer solution was diluted to 25% solids and had a Brookfield viscosity of 21.0 cps at 25° C.

Example 5
Preparation of Acrylic Acid/2-Acrylamido-2-methylpropanesulfonic Acid/Ammonium Allylpolyethoxy (10)Sulfate Terpolymer Utilizing the procedure and apparatus similar to Example 4, 127.9 g of deionized water, 20.5 g of isopropyl alcohol and 58.5 g (0.1 mol) of ammonium allyl polyethoxy-(10)-sulfate monomer were charged to the reaction flask. While sparging with nitrogen, the solution was heated to 85° C. Sodium persulfate solution and a solution containing 21.6 g (0.3 mol) of acrylic acid and 20.7 g (0.1 mol) of 2-acrylamido-2-methylpropane sulfonic acid (AMPS®, from Lubrizol Inc.) were added separately to the reaction flask over a two-hour period. Following the addition, the solution was heated to 95° C. and held for two hours before cooling down and pH adjustment. The structure of the resulting copolymer was verified by Carbon 13 NMR. The polymer solution was diluted to 25% solids and had a Brookfield viscosity of 17.0 cps at 25° C.

Example 6
Preparation of Allylpolyethoxy (10)Phosphate

A suitable reaction flask was equipped with a mechanical agitator, a thermometer, and a reflux condenser. 20 g of hydroxypolyethoxy-(10)-allyl ether (0.04 mol., AAE-10, from Bimax Inc.) were charged to the reactor. 6.16 g of phosphorous oxychloride (0.04 mol) was added drop-wise to the reactor. The mixture was stirred vigorously for one hour followed by heating to 50° C. and holding for 4.5 hours.

After cooling to ambient temperature, the reaction was quenched by slow addition to water. The pH was adjusted to 4 with caustic solution. Carbon 13 NMR analysis indicated the presence of phosphate ester.

Example 7
Preparation of Acrylic Acid/Allylpolyethoxy (10)Phosphate Copolymer

Utilizing the procedure and apparatus similar to Example 1, 41.3 g of deionized water and 60.3 g (0.05 mol) of 49.8% allylpolyethoxy (10)phosphate from Example 6 were charged to the reaction flask. While sparging with nitrogen, the solution was heated to 85° C. A solution of 2,2'-azobis (2-amidinopropane)hydrochloride (1.07 g) and 10.7 g (0.147 mol) of acrylic acid were added gradually to the reaction flask over a two-hour period. Following the addition, the solution was heated to 95° C. and held for 90 minutes before cooling down and pH adjustment. The structure of the resulting copolymer was verified by Carbon 13 NMR. The polymer solution was diluted to 25% solids and had a Brookfield viscosity of 221.0 cps at 25° C.

Example 8
Preparation of Acrylic Acid/Allylpolyethoxy (10)Sulfate Copolymer

Utilizing the procedure and apparatus similar to Example 1, 58.6 g of deionized water, 58.6 g (0.1 mol) of allylpolyethoxy (10)sulfate and 0.8 g of allyl alcohol were charged to the reaction flask. While sparging with nitrogen, the solution was heated to 85° C. A solution of sodium persulfate (1.92 g) in 6.0 g of water and 21.6 g (0.147 mol) of acrylic acid were added gradually to the reaction flask over a two-hour period. Following the addition, the solution was heated to 95° C. and held for 90 minutes before cooling of the resulting copolymer was verified by Carbon 13 NMR. The polymer solution was diluted to 25% solids and had a Brookfield viscosity of 65.0 cps at 25° C.

Table 1 summarizes the composition and physical properties of the copolymers prepared in accordance to the procedure described above. In Table 1, Examples 1–8 were prepared in accordance with the above correspondingly numbered descriptions. Example 9 was prepared in accordance with the description above for Examples 3–5 with a modified comonomer molar ratio. Examples 10–20 were prepared in accordance with the descriptions of Examples 1 and 2 with modified comonomer molar ratios and molecular weights. The molecular weights were obtained by Size Exclusion Chromatography analysis using polyacrylic acid as standards.

TABLE I

| Example | Polymer Composition Comonomer Molar Ratio | % Solids | Brookfield Viscosity #1 S @60 rpm | pH | Molecular Weight (Mw) |
|---|---|---|---|---|---|
| 1 | AA/APES (3/1) | 29.70 | 48.6 | 9.8 | 18,420 |
| 2 | AA/APES (3/1) | 29.23 | 13.0 | 4.2 | 30,670 |
| 3 | AA/AHPS/APES (3/1/1) | 30.10 | 27.2 | 8.3 | 13,100 |
| 4 | AA/MAA/APES (3/1/1) | 25.20 | 21.0 | 5.7 | 19,600 |
| 5 | AA/AMPS/APES (3/1/1) | 25.10 | 17.0 | 5.8 | 17,800 |
| 6 | AA/AAE-10 phosphate (3/1) | 25.7 | 221.0 | 6.5 | — |
| 7 | MAA/APES (6/1) | 30.75 | 44.3 | 8.3 | 11,490 |
| 8 | AA/APES (3/1) | 25.7 | 65.0 | 7.4 | 72,100 |

TABLE I-continued

| Example | Polymer Composition Comonomer Molar Ratio | % Solids | Brookfield Viscosity #1 S @60 rpm | pH | Molecular Weight (Mw) |
|---|---|---|---|---|---|
| 9 | AA/AHPS/APES (6/1/1) | 30.47 | 30.5 | 9.4 | 15,790 |
| 10 | AA/AHPS/APES (3/1/1) | 30.11 | 28.3 | 8.0 | 8,252 |
| 11 | AA/APES (3/1) | 29.53 | 13.2 | 4.4 | 13,100 |
| 12 | AA/APES (3/1) | 25.10 | 19.0 | 6.1 | 15,300 |
| 13 | AA/APES (3/1) | 24.8 | 13.0 | 5.9 | 10,100 |
| 14 | AA/APES (3/1) | 29.46 | 19.6 | 5.9 | 5,910 |
| 15 | AA/APES (4/1) | 30.76 | 18.5 | 5.9 | 4,660 |
| 16 | AA/APES (4/1) | 24.9 | 16.0 | 6.0 | 12,600 |
| 17 | AA/APES (4/1) | 25.16 | 15.0 | 4.1 | 43,700 |
| 18 | AA/APES (6/1) | 24.10 | 20.0 | 6.0 | 14,200 |
| 19 | AA/APES (6/1) | 27.15 | 42.4 | 4.1 | 138,090 |
| 20 | AA/APES (6/1) | 30.13 | 15.2 | 4.1 | 5,250 |

AA = acrylic acid
MAA = methacrylic acid
APES = ammonium allylpolyethoxy(10) sulfate, containing 10 moles of ethylene oxide, DVP-010, from Bimax Inc.
AHPS = 1-allyloxy-2-hydroxypropyl-3-sulfonic ether, from BetzDearborn Inc.
AAE-10 Phosphate = zpolyethyleneglycol (10 moles of ethylene oxide) allyl ether phosphate
AMPS ®= 2-acrylamido-2-methylpropanesulfonic acid, from Lubrizol Inc.

Example 9
Phosphate Scale Inhibition—Bottle Test Protocol

The testing of phosphate scale inhibition was undertaken in a static beaker test at varying treatment levels. The test protocol involved adding the treatment to a 100 ml solution containing calcium and phosphate ions and having a pH of 8.2 at 70° C. After 18 hours, a portion was filtered hot and the pH adjusted to <2.0 with hydrochloric acid. Percent inhibition was calculated from the determination of phosphate concentrations in the treated, stock and control solutions. The solution appearance was evaluated by visual inspection and compared to stock solutions. The conditions of the tests were: 400 ppm Ca, 100 ppm Mg and 35 ppm M-alkalinity all as $CaCO_3$. Table 2 summarizes the percent inhibition of a known polymeric inhibitor/dispersant and polymers in accordance with the present invention over a broad range of treatment dosages. Table 3 summarizes the percent inhibition of a known polymeric inhibitor/dispersant and polymers in accordance with the present invention over a broad range of treatment dosages in the presence of 3 ppm $FeCl_2$. The data in tables 2 and 3 show the efficacy of the polymeric treatments of the present invention compared to a known treatment.

TABLE 2

Percent Inhibition of various polymeric inhibitors/dispersants.

| Treatment | 5 ppm | 7.5 ppm | 10 ppm | 12 ppm |
|---|---|---|---|---|
| AA/AHPS | 16.5 | 12 | 36.5 | 97 |
| AA/AHPS/APES (3/1/1) | 75 | 90 | 96.5 | 97.5 |
| AA/APES (3/1) | 59.7 | 100 | 96.5 | 96.7 |

AA/AHPS is Acrylic acid/Allyl hydroxypropyl sulfonate ether, Mw about 15,000.
AA/AHPS/APES is Acrylic acid/Allyl hydroxypropyl sulfonate ether/Allylpolyethoxy sulfate prepared in accordance with Example 3 above.
AA/APES is Acrylic acid/Allylpolyethoxy sulfate prepared in accordance with Example 1 above.

TABLE 3

Percent Inhibition of various polymeric inhibitors/dispersants in the presence of 3 ppm of FeCl$_3$.

| Treatment | 5 ppm | 7.5 ppm | 10 ppm | 12 ppm |
|---|---|---|---|---|
| AA/AHPS | 0 | 3.3 | 77.8 | 100 |
| AA/AHPS/APES (3/1/1) | 25.5 | 80.5 | 100 | 100 |
| AA/APES (3/1) | 56.6 | 100 | 100 | 100 |

AA/AHPS is Acrylic acid/Allyl hydroxypropyl sulfonate ether, Mw about 15,000.
AA/AHPS/APES is Acrylic acid/Allyl hydroxypropyl sulfonate ether/Allylpolyethoxy sulfate prepared in accordance with Example 3 above.
AA/APES is Acrylic acid/Allylpolyethoxy sulfate prepared in accordance with Example 1 above.

Example 10
Phosphate Scale Inhibition—Dynamic Heat Transfer Simulations

Developmental testing was also initiated with the AA/APES (3:1), Mw about 18,000, chemistry under dynamic heat transfer conditions in a laboratory scale cooling test rig. The water matrix contained 600 ppm Ca, 300 ppm Mg, 50 ppm M-alkalinity (all as CaCO$_3$), 15 ppm orthophosphate, 3 ppm pyrophosphate, 1.2 ppm halogen substituted azole corrosion inhibitor, and either the AA/APES (Mw about 18,000), AA/AHPS (Mw about 15,000) or AA/AHPS/APES (Mw about 13,000) polymer. Operating parameters included a bulk temperature of 120° F., a heat transfer rate of 8,000 BTU/(ft$^2$*hr) across a mild steel heat transfer tube, a water velocity of 2.8 ft/sec, a retention time of 1.4 days (to 75% depletion) and a test duration of 7 days. Both mild steel and admiralty brass coupons were also inserted into the test rig. A summary of the polymer comparison is shown below.

| | Dosage (ppm) | Turbidity (NTU) | Delta PO4 (ppm) | Heat Transfer Appearance |
|---|---|---|---|---|
| AA/AHPS | 4 | 0.68 | 0.23 | Fail - Slight Deposition |
| AA/AHPS | 5 | 0.36 | 0.2 | Pass - Very Slight Deposition |
| AA/APES | 2 | 0.15 | 0.2 | Pass - No Deposition |

In this simulation, three parameters are monitored which are indicative of polymer performance. They are 1) the bulk turbidity values which develop in the cooling water, 2) the average delta phosphate values (the difference between filtered and unfiltered phosphate concentrations), and 3) the amount of deposition which is observed on the heat transfer tube. Under this recirculating rig condition, 5 ppm AA/AHPS is necessary to maintain acceptable heat transfer deposit control. A lower dosage of 4 ppm AA/AHPS results in a failure as indicated by slight deposition having been observed on the tube surface. In contrast, 2 ppm of the AA/APES chemistry not only keeps bulk turbidity and delta phosphate values low but also keeps the heat transfer surface free of deposition. This is a significant reduction (60%) in the amount of polymer necessary to control deposition in this cooling water.

Additional testing was conducted under two upset conditions, i.e. elevated temperature/heat flux and 3 ppm iron contamination. These results are shown below.

| | Dosage (ppm) | Turbidity (ntu) | Delta PO4 (ppm) | Heat Transfer Appearance |
|---|---|---|---|---|
| High Temp/Flux AA/AHPS | 5 | 0.33 | 0.2 | Fail - Slight Deposition |
| AA/APES | 2 | 0.31 | 0.5 | Pass - Very Slight Deposition |
| 3 ppm Fe+2 AA/AHPS | 12 | 7.1 | 1.2 | Fail - Slight Deposition |
| AA/AHPS | 9 | 12.9 | 3.7 | Fail - Slight Deposition |
| AA/APES | 6 | 5.3 | 0.6 | Pass - No Deposition |

The high temperature/flux evaluations were conducted using a bulk temperature of 140° F. and a heat flux of 16,000 BTU/(ft$^2$*hr) across the mild steel heat transfer tube. Again, the AA/AHPS simulation, at a dosage of 5 ppm, resulted in a test failure with significant heat transfer deposition having been observed. During the 2 ppm AA/APES evaluation, only a very slight amount of deposit was observed under this stressed condition.

The iron contamination studies were conducted by adding 0.5 ppm iron (Fe$^{+2}$) to the cooling water after the initial 24 hours of the evaluation. At this point, continuous feed of an iron solution was initiated into the test rig targeting a 3 ppm iron level, i.e. a 100 ppm Fe$^{+2}$ solution was now fed to the rig at a rate of 0.24 mls/min. Under this condition, AA/AHPS was shown to be ineffective at both a 9 ppm and a 12 ppm dosage. Elevated turbidity (7–13 NTU) and delta phosphate values (1–3.7 ppm) were observed, in addition to unacceptable deposition having formed on the heat transfer surface. The AA/APES chemistry, at a lower dosage of 6 ppm, maintained a lower bulk turbidity (5.3 ntu), a lower delta phosphate value (0.6 ppm) and, most importantly, prevented deposition on the heat transfer tube surface.

Example 11

Silica Polymerization Inhibition

Testing of silica polymerization inhibition was undertaken. The testing involved preparing 100 ml of a 500 ppm silica solution adjusted to pH 7.4, and adding 30 ppm of a treatment. This solution was placed in a 30° C. water bath and monomeric silica determinations were initiated and repeated every 30 minutes. The Hach Molybdate Reactive Silica test was utilized to determine the polymerization of silica. As polymerization occurs, the monomeric silica levels decrease. If the treatment is effective, elevated monomeric concentrations are realized relative to the untreated control. Tables 4 and 5 summarize the results of testing of several conventional treatments as well as a polymer in accordance with the present invention. At each time interval, the AA/APES chemistry maintains higher monomeric silica levels i.e. inhibits polymerization, than the other treatments.

TABLE 4

Silica Levels (ppm) as a function of time (minutes) for each treatment

| Time | Control | AA/AHPS Mw about 18,000 | AA/PEG Mw~35,000 | AA/AHPS/PEG Mw~25–28,000 | Dequest 2010 | AA/AHPS Mw about 13,000 |
|---|---|---|---|---|---|---|
| 0 | 430 | 460 | 470 | 485 | 492 | |
| 30 | 390 | 380 | 408 | 438 | 458 | 463 |
| 60 | 368 | 325 | 355 | 400 | 412 | 395 |
| 90 | 325 | 302 | 322 | 358 | 368 | 343 |
| 120 | 300 | 288 | 312 | 328 | 342 | 318 |
| 150 | 278 | 278 | 290 | 318 | 328 | 298 |
| 180 | 275 | 262 | 280 | 295 | 308 | 275 |
| 210 | 260 | 258 | 270 | 282 | 300 | 290 |
| 240 | 242 | 240 | 242 | 268 | 270 | 258 |
| 270 | 230 | 245 | 260 | 270 | 268 | 253 |
| 300 | 235 | 242 | 262 | 255 | 268 | 243 |
| 330 | 222 | 238 | 242 | 248 | 260 | 238 |
| 360 | 230 | 242 | 242 | 245 | 255 | 230 |
| 390 | 225 | 215 | 230 | 230 | 248 | 225 |

PEG is polyethyleneglycol (10 moles of ethyleneoxide) allyl ether

TABLE 5

Silica Levels (ppm) as a function of time (minutes) for each treatment

| Time | Control | Acumer 1100 | AA/AEPS Mw about 18,000 | Belclene 400 | PESA |
|---|---|---|---|---|---|
| 0 | 430 | 530 | 495 | 483 | 495 |
| 30 | 390 | 368 | 458 | 400 | 463 |
| 60 | 368 | 320 | 468 | 365 | 445 |
| 90 | 325 | 273 | 450 | 325 | 420 |
| 120 | 300 | 263 | 433 | 310 | 385 |
| 150 | 278 | 250 | 425 | 283 | 363 |
| 180 | 275 | 240 | 418 | 275 | 348 |
| 210 | 260 | 248 | 388 | 265 | 325 |
| 240 | 242 | 232 | 388 | 255 | 302 |
| 270 | 230 | 228 | 375 | 255 | 282 |
| 300 | 235 | 220 | 362 | 240 | 280 |
| 330 | 222 | 222 | 345 | 235 | 270 |
| 360 | 230 | 213 | 343 | 238 | 265 |
| 390 | 225 | 215 | 332 | 232 | 252 |

Acumer 1100 is polyacrylic acid available from Rohm & Haas.
Belclene 400 is available from FMC Corp.
PESA is polyepoxysucininc acid Example 12

Silica Deposition Inhibition

Bottle tests were conducted to evaluate the effects of treatments of the present invention on the solubility of silica and phosphate in the presence of aluminum. The test waters contained 700 ppm calcium, 185 ppm magnesium and 35 ppm M Alkalinity (as all $CaCO_3$), 90 ppm $SiO_2$, 14 ppm orthophosphate, 2 ppm pyrophosphate+a specific treatment. Treatments included a copolymer of AA/AHPS (Mw about 15,000), a second copolymer of AA/AHPS with a higher molecular weight (Mw about 55,000), and HEDP (hydroxyethylidene diphosphonic acid). The test waters were placed in 100 ml aliquots. A dosage of 5.0 ppm $Al^{3+}$ was added to each aliquot, the pH adjusted to 8.0 and the aliquots held at 130° F. overnight. Filtered/unfiltered (F/UF) analyses of the water constituents were then conducted. The following table shows the results.

| Treatment, ppm | Al (F/UF) | Mg (F/UF) | TP (F/UF) | $SiO_2$ (F/UF) | Ca (F/UF) |
|---|---|---|---|---|---|
| AA/AHPS-1, 20 | 0.1/5.1 | 190/190 | 6.5/16 | 71/89 | 680/700 |
| AA/AHPS-1, 35 | 0.8/5.1 | 180/190 | 8.9/16 | 71/88 | 670/690 |
| AA/AHPS-1, 50 | 2.0/5.0 | 180/190 | 11/16 | 75/88 | 670/690 |
| AA/AHPS-2, 20 | 0.2/5.0 | 190/190 | 6.2/15 | 71/88 | 670/690 |
| AA/AHPS-2, 35 | 0.8/5.1 | 190/190 | 8.5/16 | 73/89 | 690/700 |
| AA/AHPS-2, 50 | 2.8/5.1 | 190/190 | 15/15 | 79/88 | 680/700 |
| AA/AHPS-2, 20 + HEDP, 1.7 | 0.2/5.1 | 190/190 | 6.1/17 | 71/90 | 680/710 |
| AA/AHPS-2, 35 + HEDP, 3.0 | 0.7/5.1 | 190/190 | 9.6/19 | 73/89 | 690/700 |
| AA/AHPS-2, 50 + HEDP, 4.3 | 1.0/4.9 | 190/180 | 12/19 | 73/86 | 680/680 |
| AA/APES, 20 | 4.0/5.1 | 190/190 | 13/15 | 83/88 | 690/690 |
| AA/APES, 35 | 4.8/5.1 | 190/190 | 15/15 | 87/90 | 700/710 |
| AA/APES, 50 | 5.0/5.0 | 190/180 | 15/14 | 88/87 | 700/680 |

As the table shows, AA/AHPS 1 (Mw about 15,000), AA/AHPS-2 (Mw about 55,000), and AA/AHPS-2+HEDP, were ineffective in maintaining solubility, even at very high dosages. In striking contrast, the AA/APES (Mw about 13,000) polymer kept all the species soluble, even when fed at lower dosages.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method of inhibiting the formation and deposition of scale imparting species on surfaces exposed to an aqueous system comprising adding to said aqueous system an effective amount for the purpose of a water-soluble or water-dispersible polymer of the formula:

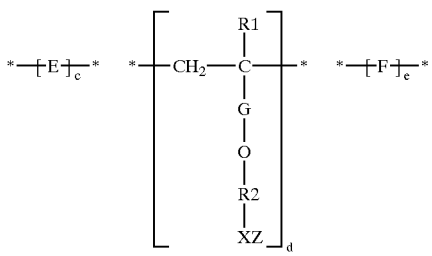

wherein E is the repeat unit remaining after polymerization of an ethylenically unsaturated compound; R1 is H or lower $(C_1–C_4)$alkyl; G is —$CH_2$— or —$CHCH_3$—; R2 is $\text{-(}CH_2\text{—}CH_2\text{—O-)}_n$ or $\text{-(}CH_2\text{—}CHCH_3\text{—O-)}_n$;

wherein n ranges from about 1 to 100; X is $SO_3$, $PO_3$ or $COO$; Z is H, hydrogens, or a water-soluble cationic moiety; F is a repeat unit of the formula:

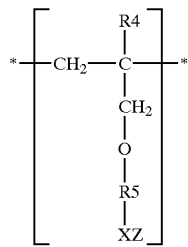

wherein R4 is H or lower (C1–C4)alkyl, R5 is hydroxy substituted alkyl or alkylene having from 1 to 6 carbon atoms; c and d are positive integers; and e is a non-negative integer.

2. The method of claim 1, wherein said ethylenically unsaturated compound is one or more of: carboxylic acid, sulfonic acid, phosphonic acid or amide form thereof or mixtures thereof.

3. The method of claim 2, wherein said ethylenically unsaturated compound is one or more of: acrylic acid, methacrylic acid, acrylamide, methacrylamide, N-methyl acrylamide, N,N-dimethyl acrylamide, N-isopropyl acrylamide, maleic acid or anhydride, fumaric acid, itaconic acid, styrene sulfonic acid, vinyl sulfonic acid, isopropenyl phosphonic acid, vinyl phosphonic acid, vinylidene diphosphonic acid, 2-acrylamido-2-methylpropane sulfonic acid or mixtures thereof.

4. The method of claim 1, wherein said water-soluble cationic moiety is selected from the group Na, K, Ca or $NH_4$.

5. The method of claim 1, wherein the molecular weight Mw ranges from 1,000–1,000,000.

6. The method of claim 1, wherein the molecular weight Mw ranges from about 1,000 to about 50,000.

7. The method of claim 1, wherein the molecular weight Mw ranges from about 1,500 to 25,000.

8. The method of claim 1, wherein the ratio c:d:e ranges from about 20:10:1 to 1:1:20.

9. The method of claim 1, wherein e is zero and the ration c:d ranges from about 30:1 to about 1:20.

10. The method of claim 1, wherein n ranges from about 1 to 20.

11. The method of claim 1, wherein said polymer is added to said aqueous system in an amount from about 0.1 ppm to about 500 ppm.

12. The method of claim 1, wherein said polymer is added to said aqueous system in an amount of from about 1 ppm to about 100 ppm.

13. The method of claim 1, where in said aqueous system is a steam generating system.

14. The method of claim 1, wherein said aqueous system is a cooling water system.

15. The method of claim 1, wherein said aqueous system is a gas scrubber system.

16. The method of claim 1, wherein said water-soluble or water-dispersible polymer is added in combination with at least one or more topping agents.

17. A method of inhibiting the formation and deposition of scale imparting species on surfaces exposed to an aqueous system comprising adding to said aqueous system an effective amount for the purpose of a water-soluble or water-dispersible polymer of the formula:

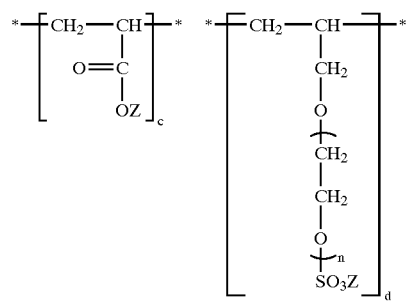

wherein n ranges from about 1–100, Z is hydrogen or a water-soluble cation and wherein the ratio c:d ranges from about 30:1 to about 1:20.

18. The method of claim 17, wherein said water soluble cation is selected from the group consisting of Na, K, Ca or $NH_4$ or mixtures thereof.

19. The method of claim 17, wherein the molecular weight Mw ranges from about 1,000 to 1,000,000.

20. The method of claim 17, wherein the molecular weight Mw ranges from about 1,000 to 50,000.

21. The method of claim 17, wherein the molecular weight Mw ranges from about 1,000 to 25,000.

22. The method of claim 17, wherein n ranges from about 1 to 20.

23. The method of claim 17, wherein said polymer is added to said aqueous system in an amount from about 0.1 ppm to about 500 ppm.

24. The method of claim 17, wherein said polymer is added to said aqueous system in an amount of from about 1 ppm to about 100 ppm.

25. The method of claim 17, where in said aqueous system is a steam generating system.

26. The method of claim 17, wherein said aqueous system is a cooling water system.

27. The method of claim 17, wherein said aqueous system is a gas scrubber system.

28. The method of claim 17, wherein said water-soluble or water-dispersible polymer is added in combination with at least one or more topping agents.

29. A method of inhibiting the formation and deposition of scale imparting species on surfaces exposed to an aqueous system comprising adding to said aqueous system an effective amount for the purpose of a water-soluble or water-dispersible polymer of the formula:

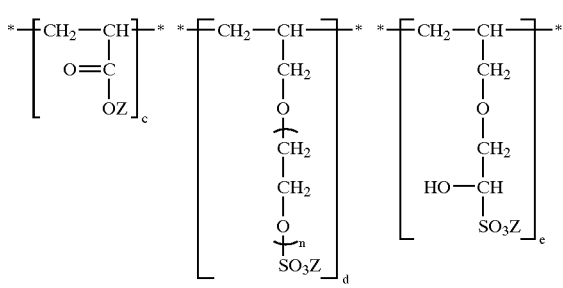

wherein n ranges from about 1–100, and Z is hydrogen or a water-soluble cation and wherein the ratio c:d:e ranges from about 20:10:1 to about 1:1:20.

30. The method of claim 29, wherein said water soluble cation is selected from the group consisting of Na, K, Ca or $NH_4$ or mixtures thereof.

31. The method of claim 29, wherein said polymer is added to said aqueous system in an amount from about 0.1 ppm to about 500 ppm.

32. The method of claim 29, wherein said polymer is added to said aqueous system in an amount of from about 1 ppm to about 100 ppm.

33. The method of claim 29, wherein said aqueous system is a steam generating system.

34. The method of claim 29, wherein said aqueous system is a cooling water system.

35. The method of claim 29, wherein said aqueous system is a gas scrubber system.

36. The method of claim 29, wherein the molecular weight Mw ranges from about 1,000 to 1,000,000.

37. The method of claim 29, wherein the molecular weight Mw ranges from about 1,000 to 50,000.

38. The method of claim 29, wherein the molecular weight Mw ranges from about 1,000 to 25,000.

39. The method of claim 29, wherein n ranges from about 1 to 20.

40. The method of claim 29, wherein said water-soluble or water-dispersible polymer is added in combination with at least one or more topping agents.

* * * * *